March 21, 1933.    E. J. W. RAGSDALE    1,902,181
SELF ADJUSTING BRAKE MECHANISM
Filed March 20, 1926
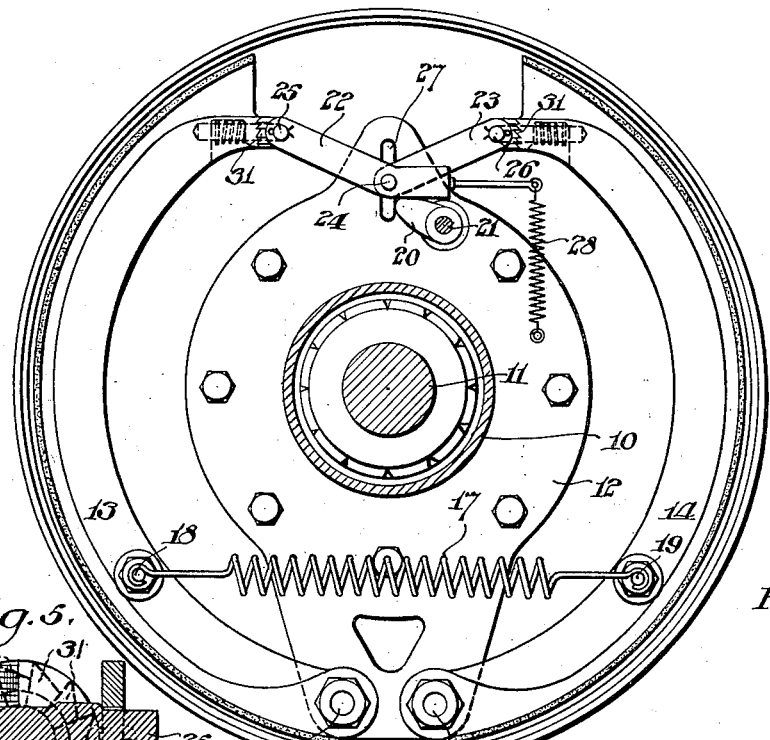
Fig.1.
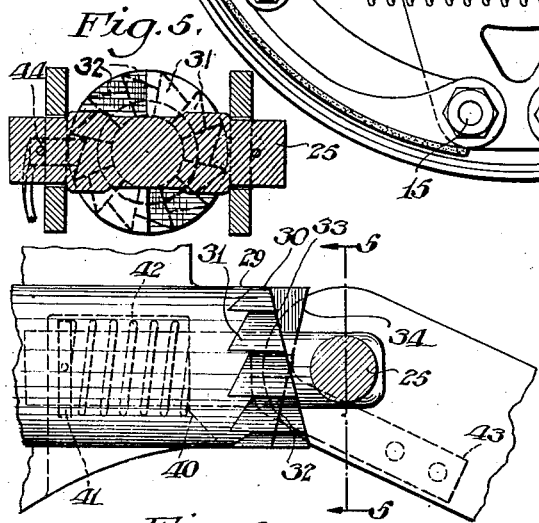
Fig.5.
Fig.4.
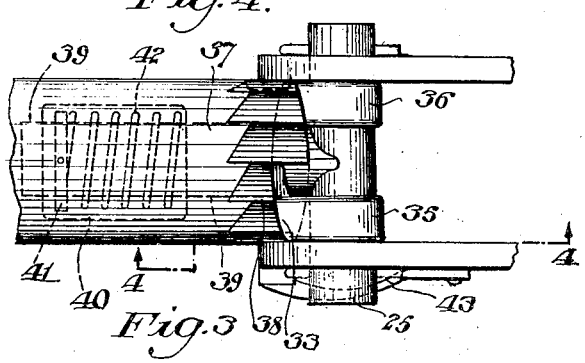
Fig.3.
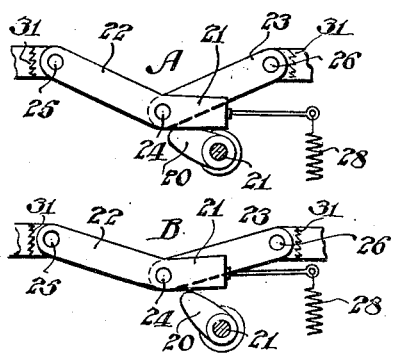
Fig.2.
INVENTOR:
Earl J. W. Ragsdale,
BY
ATTORNEY.

Patented Mar. 21, 1933

1,902,181

UNITED STATES PATENT OFFICE

EARL J. W. RAGSDALE, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

SELF-ADJUSTING BRAKE MECHANISM

Application filed March 20, 1926. Serial No. 96,119.

The invention relates to brake mechanisms for motor vehicles and more particularly to an adjusting device for such mechanisms to compensate for wear.

The invention has for its main object to provide means for automatically compensating for wear between the coacting parts of the brake mechanism whereby length of service of the brake and the effectiveness of the braking action are increased without the attention of the operator.

Another object of the invention is to provide means for automatically taking up the wear between the coacting parts of the braking mechanism whereby the same length of throw of the operating members will produce substantially the same braking action after the parts have been worn as when the parts were new.

Another object of the invention is to provide means for taking up the wear between the coacting parts which, while permitting of the fine adjustment required, is yet of such strong and rugged construction as to insure prolonged life.

Other objects of the invention than those specifically stated above will be apparent from the following description taken in connection with the drawing, in which:

Fig. 1 is a sectional view through a rear wheel axle of a motor vehicle, showing one form of brake mechanism to which the invention may be applied.

Fig. 2 is a more or less diagrammatic representation showing three different positions A, B and C of the toggle links.

Fig. 3 is a view in plan and on an enlarged scale of connection between a toggle link and the end of a brake shoe.

Fig. 4 is a sectional side elevation of the parts shown in Fig. 3, the section being taken on the line 4—4 of Fig. 3. The position of the spring pawl, secured to the side member of the toggle link not appearing in this figure is indicated in dotted lines.

Fig. 5 is a sectional view, taken on the line 5—5 of Fig. 4, looking in the direction of the arrows.

In the embodiment of the invention selected for illustration, the brake mechanism is shown mounted, as is usual, on a tubular axle casing 10 of the rear axle 11 of a motor vehicle. The tubular casing may have an annular flange, not shown, to which is bolted a brake shoe supporting member 12, which may be a stamped steel plate of the form shown in Fig. 1.

The brake shoes 13 and 14 are pivotally mounted at 15 and 16 at one end of the supporting plate 12 and each of the shoes has an inwardly projecting strengthening rib which extends substantially throughout the length of the shoe. A spring 17 engages, at its opposite ends, pins 18 and 19 carried by the strengthening ribs, this spring acting to retract the shoes after the shoe actuating means has been released.

The brake shoe actuating mechanism may comprise a cam 20 secured to cam shaft 21 suitably supported in bearings on the plate 12, and adapted to be actuated in known manner from an operating lever or foot pedal on the vehicle.

This cam 20 is adapted to cooperate with the projecting end of a link 22 forming one of a pair of toggle links 22 and 23 pivotally connected together by a center pin 24 and to the free ends of the brake shoes 13 and 14, respectively, by the pivot pins or trunnion 25 and 26.

Each toggle link preferably consists of a pair of parallel members, see Fig. 3, arranged on the opposite sides of the brake shoe ends and the plate 12. A spring 28 may be provided to assist the return of the toggle links and the brake shoes to inoperative position. The center pin 24 connecting the toggle links extends through and is guided by a slot 27 in the plate 12. This slot and pin holds the brake shoes central and aids in their individual adjustment, as will presently appear.

By the construction heretofore described, it will be evident that as the brake parts wear, the included angle between the toggle links becomes greater as the wear proceeds, and the brake operating cam shaft and the parts operating it (not shown) will have to be moved further to secure the same braking action. It has heretofore been proposed to make manual adjustments in the braking mechanism to compensate for wear, but this has been attended with more or less difficulty in view of the relative inaccessibility of the parts of the brake mechanism, and the amount of such adjustmnt had ordinarily to be determined by successive trials, involving a slow and laborious procedure.

By the present invention, the adjustment of the brake mechanism to compensate for wear is effected automatically, and for this purpose, I prefer to utilize the overthrow movement of the toggle links beyond their normal position as represented by position B in Fig. 2 of the drawing. The means for effecting this adjustment are illustrated clearly in the enlarged detail views shown in Figs. 3, 4 and 5 and will now be described.

To this end, the pivot pin or trunnion 25 connecting the link 22 and the shoe 13 is adjustably mounted, so that the distance between it and the end of the shoe may be varied, which is, in effect, changing the length of the shoe. I accomplish this variation in the length of the shoe by introducing between the end of the shoe at 29 and the pivot member 25 a sleeve 30 of peculiar formation. As shown in the drawing, this sleeve is formed with two sets of ratchet teeth, 31 and 32. The teeth 31 are formed on that end face of the sleeve abutting the end 29 of the shoe, and the end of the shoe is provided with teeth cooperating with the teeth 31 to prevent rotation of the sleeve in one direction. The teeth 32 are provided on the periphery of the sleeve and are equal in number to the teeth 31 and in alignment therewith.

On its outer face the sleeve 30 is formed with a pair of reversely inclined face cams 33 and 34, extending through an arc of substantially 180°. The pivot member 25 is provided, at opposite sides of its center, with collars 35 and 36 which are provided with cam surfaces complemental to the cam surfaces 33 and 34, and adapted to ride on those surfaces. The pivot member 25, between said collars 35 and 36 is provided with a stem 37 projecting through registering openings 38 and 39 in the sleeve and shoe, respectively, and through an enlarged recess 40 in the shoe open at the bottom. Adjacent the inner end of said recess the stem 37 has a collar 41 suitably pinned thereto, and between said collar and the outer wall of said recess a spiral spring 42 surrounds the stem 37 and urges the same endwise to keep the cam surfaces on the collars 35 and 36 in cooperative relation with the cam surfaces 33 and 34 on the sleeve 30. This spring permits endwise movement of the stem 37 in the rotation of the sleeve 30 in a clockwise direction, Fig. 5, to allow the teeth 31 on the end face of its sleeve to click over the corresponding teeth on the end of the shoe. Reverse rotation of the sleeve 30 is prevented by the coaction of these teeth.

From the foregoing description and the showing in the drawing it will be evident that the rotation of the sleeve 30 in clockwise direction, Fig. 5, will cause the cams on sleeves 35 and 36 to ride up the cam surfaces 33 and 34, and hence increase the distance between the end of the shoe at 29 and the toggle link pivot 25.

To effect this rotation automatically, I secure to the outside face of the right hand member of the toggle link 22 a spring pawl 43 this pawl having its inturned end 44 (Fig. 5) in position and formed to cooperate with the peripheral series of teeth 32 on the sleeve member 30.

In Fig. 2 the toggle links are shown in three different positions A, B and C which they may assume in the practical operation of the brake mechanism of my invention. The upper view A shows the angular relation of the toggle links when the brake shoes are in their retracted inoperative position. The intermediate view B shows the position of the toggle-links and actuating cam when the brake shoes are applied and operatively engage the drum, but the brake parts have not yet become worn. The lower view C shows the overthrow position of the toggle links which they may assume only after the brake parts have become worn.

In moving from the angular relation shown in A to the angular relation shown in C the end of the spring pawl 44 is given a movement sufficient to cause the rotation of the sleeve 30 in a clockwise direction through the distance of one tooth. The teeth 31 and 32 are proportioned and spaced such distances from each other as to permit this.

From the foregoing description of the construction of my improved device, its operation will be readily understood.

Assuming that the brake shoes are in operative position shown in Fig. 1 and position A of Fig. 2 and the nose of the pawl 43 lies in engagement with a radial face of a tooth 32. Whenever the toggle links are moved so as to apply the brakes to the position B shown in Fig. 2, the nose of the pawl will move away from the radial face of one tooth and ride up the inclined face of the next tooth. As long as the brake shoes have not become unduly worn, the application of the brake does not move the pawl through a sufficient distance to cause it to engage the succeeding tooth 32. After there has been sufficient wear to permit the movement of the links to the position C shown at the bottom of Fig. 2, the nose of the pawl 43 will be moved into engagement with a succeeding tooth with the result that, when the brake shoes are subsequently returned to their inoperative position, the sleeve 30 will be rotated in clockwise direction, Fig. 5, through the distance of one tooth. In such rotation, the radial teeth 31 and the sleeve are all advanced one tooth relative to the cooperating teeth on the end of the brake shoe, reverse rotation being at all times prevented by the interengagement of these ratchet teeth. This advancing of the sleeve through one tooth, of course, causes the cams on the sleeves 35 and 36 on the pivot 25 to ride up the inclined surface 33 and 34 on the sleeve 30, thereby causing a slight lengthening of the distance between the pivot and the end of the shoe, and hence, in effect, increasing the length of the shoe, and thereby compensating for the wear of the brake parts.

It will be understood, that this automatic adjustment could be made in connection with one shoe only, but I prefer to adjust both shoes automatically and independently. To this end, an adjusting means similar to that above described is provided between the toggle link 23 and the other brake shoe 14. The guiding of the center pin 24 of the toggle links in the slot 27 of the supporting plate 12, aids the equal individual adjustment of both brake shoes.

While one embodiment of the invention has been specifically described and illustrated, it will be understood that the invention is capable of modification, and that modification and changes may be made without departing from the spirit and scope of the invention as expressed in the following claims.

What I claim and desire to secure by Letters Patent is:—

1. Brake mechanism comprising a drum, a pair of brake shoes adapted to cooperate therewith, means including toggle links for moving said shoes into engagement with said drum, and cam means in the connection between said toggle links and brake shoes operable by relative movement between the toggle links and brake shoes for making an automatic adjustment for wear of either or both brake shoes.

2. Brake mechanism comprising a drum, a brake shoe cooperating therewith and having one end thereof mounted on a fixed pivot, and the opposite end thereof adapted to be moved by a link, said link in moving the shoe into engagement with the drum changing its angular relation to the shoe, said angular relation changing as the shoe becomes worn, and cam means automatically operable by a predetermined relative angular movement of the shoe and link for adjusting the length of the shoe to compensate for wear.

3. Brake mechanism comprising a drum, a pair of brake shoes adapted to cooperate with said drum, means including toggle links for moving said shoes into engagement with said drum, and cam means in the pivotal connection between said links and brake shoes operable by relative movement of said links and shoes for automatically adjusting the pivots to compensate for wear of the brake elements.

4. Brake mechanism comprising a drum, a brake shoe adapted to co-operate therewith, means for moving said shoe into engagement with said drum including a toggle pivotally connected with said shoe, and means comprising a cam sleeve adapted to be automatically rotated upon overthrow of said toggle due to wear of the brake parts to compensate for such wear by adjusting the pivotal connection.

5. Brake mechanism comprising a drum, a brake shoe adapted to be moved into operative or inoperative relation with respect to said drum, moving means for said brake shoe comprising a link, pivoted to said shoe, the angle between said link and shoe changing as the brake parts become worn, and means whereby a predetermined change in the angular relation of said link and shoe effects an automatic adjustment of the pivotal connection of the link to the shoe to compensate for wear, said means comprising a rotatable element associated with the brake shoe and a pawl on the link for rotating said element.

6. Brake mechanism comprising a drum, a brake shoe coacting therewith, means for actuating said brake shoe into operative engagement with said drum, said means comprising a member pivoted to said shoe and adapted to change its angular relation to said shoe as the brake parts become worn and means whereby a predetermined change in the angular relation of said link and shoe effects an automatic adjustment of the pivotal connection of the link to the shoe to compensate for wear, said means comprising a rotatable cam element associated with the brake shoe, a pawl on the link for rotating said element, and means for preventing retrograde movement of said element.

7. Braking apparatus comprising a hollow brake drum, a brake shoe therein, operating linkage engaging the shoe and operated from the outside of the drum, and automatic wear compensating means between the linkage and the shoe and directly engaging the end of the shoe and connected with the operating linkage.

8. A braking mechanism comprising a brake drum, a brake shoe, an operating cam for said shoe and a direct connection from the cam to the shoe including means operable by movement of the cam beyond a predetermined throw to automatically extend the connection upon pre-determined movement of the shoe by the cam.

9. A braking mechanism including a brake drum, a pair of brake shoes, an operating toggle linkage therebetween each arm of which directly connects with the brake shoe, said connection including means automatically operable to extend the length of the connection upon a predetermined movement of the toggle linkage.

10. In a brake, a drum, a friction member to engage said drum, a toggle connecting the adjacent ends of the member, operating means for straightening the toggle, one of the toggle links having an adjustable connection with one end of the member, pawl and ratchet mechanism operable automatically with said brake operating means to effect an adjustment and reduce the clearance of the member.

11. Brake-adjusting means comprising, in combination with a friction member, a thrust member, a cam carried by the friction member and arranged to shift the thrust member, and a pawl-and-ratchet device for operating the cam.

12. Brake-adjusting means comprising, in combination with a friction member, a thrust member, a cam carried by the friction member and arranged to shift the thrust member, a ratchet operating the cam and moving with the friction member, and a pawl operating the ratchet and not moving with the friction member.

13. A brake friction member having a thrust device and means for shifting the thrust device to compensate for wear, in combination with an applying device engaging the thrust device and also arranged to operate the shifting means.

14. A brake friction member having a thrust device and means for shifting the thrust device to compensate for wear, in combination with an applying device engaging the thrust device and provided with a part arranged to operate the shifting means after a predetermined applying movement.

15. A brake friction member having a thrust device and a ratchet arranged to shift the thrust device to compensate for wear, in combination with an applying device engaging the thrust device and having a pawl arranged to operate the ratchet.

16. A brake friction member having a thrust device and a ratchet arranged to shift the thrust device to compensate for wear, in combination with an applying device engaging the thrust device and a pawl operated by the applying device and arranged to operate the ratchet.

17. A brake comprising, in combination, friction means, an applying device, a thrust member carried by the friction means and acted on by the applying device to apply the brake, adjusting means for shifting the thrust member to increase the effective length of the friction means to compensate for wear, and a device engaged by a part of the adjusting means, after a pre-determined brake applying movement, to cause the operation of the adjusting means.

18. A brake comprising, in combination, friction means, an applying device, a thrust member carried by the friction means and acted on by the applying device to apply the brake, a cam for shifting the thrust member to increase the effective length of the friction means to compensate for wear, and cam operating means including a first part moving with the friction means and a second part engaged by the first part in case of excessive brake applying movement.

19. A brake adjusting means comprising, in combination with a friction member, a thrust member, an adjustable mounting for the thrust member, a cam carried by the friction member and arranged to adjust the position of said mounting, and a pawl and ratchet device for operating the cam.

20. A brake element having a thrust member at one end and a cam for adjusting the thrust member bodily lengthwise of the element.

21. A brake friction member having a thrust device and means for shifting the thrust device to compensate for wear, in combination with an applying device operable to actuate said thrust device and effect an adjustment thereof upon excessive brake applying movement.

22. A brake friction member having a thrust device and means for shifting the thrust device to compensate for wear, said means including an applying device and means actuable by the applying device on its reverse stroke for effecting the desired adjustment.

In testimony whereof I hereunto affix my signature.

EARL J. W. RAGSDALE.